United States Patent [19]
Stallknecht

[11] Patent Number: 5,948,375
[45] Date of Patent: Sep. 7, 1999

[54] BIOLOGICAL OXIDATION OF SULPHIDE MINERALS TO RECOVER GOLD, SILVER, PLATINUM GROUP METALS AND BASE METALS

[75] Inventor: Hendrik Stallknecht, Dan Pienaarville, South Africa

[73] Assignee: Billiton SA Limited, Johannesburg, South Africa

[21] Appl. No.: 09/084,375

[22] Filed: May 27, 1998

[30] Foreign Application Priority Data

Jun. 10, 1997 [ZA] South Africa .............................. 97/5094

[51] Int. Cl.$^6$ ........................... C22B 11/00; C22B 15/00; C22B 23/00
[52] U.S. Cl. ............................... 423/22; 423/29; 423/138; 423/150.1; 423/DIG. 17
[58] Field of Search .............................. 423/29, DIG. 17, 423/22, 138, 150.1

[56] References Cited

U.S. PATENT DOCUMENTS

| | | |
|---|---|---|
| 3,796,308 | 3/1974 | Mcilhinney et al. ............ 423/DIG. 17 |
| 4,729,788 | 3/1988 | Hutchins .......................... 423/DIG. 17 |
| 5,006,320 | 4/1991 | Reid et al. ....................... 423/DIG. 17 |
| 5,127,942 | 7/1992 | Brierley et al. .................. 423/DIG. 17 |
| 5,429,659 | 7/1995 | Spencer et al. .................. 423/DIG. 17 |
| 5,431,717 | 7/1995 | Kohr ................................ 423/DIG. 17 |
| 5,573,575 | 11/1996 | Kohr ............................... 423/DIG. 17 |
| 5,676,733 | 10/1997 | Kohr ............................... 423/DIG. 17 |
| 5,766,930 | 6/1998 | Kohr ............................... 423/DIG. 17 |

*Primary Examiner*—Steven Bos

[57] ABSTRACT

A process for treating gold bearing sulphide minerals wherein the minerals are subjected to biological oxidation, the product thereof is separated into light and heavy fractions and gold is recovered from the light fraction using a non-biological process.

12 Claims, 1 Drawing Sheet

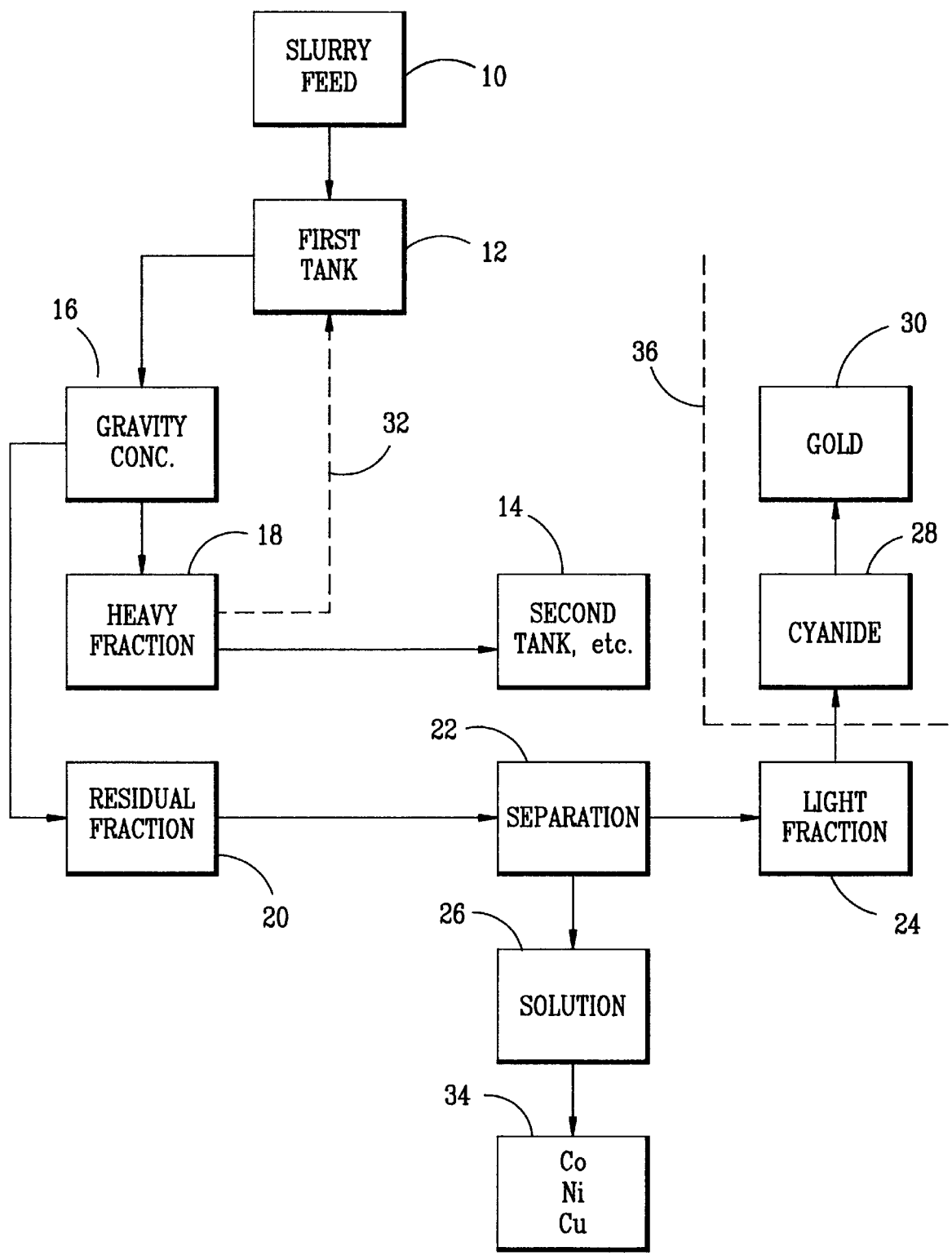

BIOLOGICAL OXIDATION OF SULPHIDE MINERALS TO RECOVER GOLD, SILVER, PLATINUM GROUP METALS AND BASE METALS

BACKGROUND OF THE INVENTION

This invention relates to the oxidation of sulphide minerals, including the recovery of gold from sulphide minerals, by means of biological oxidation.

Biological oxidation of sulphide ores, especially pyritic gold ores, has been known for some time and there are many references in the literature to ore processing in this way.

The specification of South African patent No. 90/2244 describes such a process which makes use of bacteria which are capable of oxidising the various sulphide minerals in the ore to release gold particles for subsequent recovery by known techniques.

The biological process has a number of advantages relating to the commercial recovery of a desired element from a sulphide mineral. It does however suffer from at least two disadvantages. Firstly the process is relatively slow and takes several days, of the order of from four to six days, to go to completion.

Secondly the process has been found to function most efficiently when a relatively dilute water slurry of the ore is passed through a series of agitated tanks in succession. As the slurry is dilute, typically with from 10 to 20% solids content, the tanks which are required for the slurry are large.

The process is usually conducted in a series of tanks. The first tank in the series is the most important because it is here that oxidation is initiated and where bacterial growth is maintained. The subsequent tanks in series are used to complete the oxidation of the sulphide minerals. Usually at least half of the work of oxidation is completed in the first tank. It would be advantageous if the products of oxidation could be separated from the minerals which are not yet oxidised. In this way the size of second and subsequent tanks in series could be smaller in size.

The invention lends itself to the recovery of precious metals i.e. gold, silver and the platinum group metals, and also to the recovery of base metals e.g. cobalt, nickel, copper etc.

SUMMARY OF THE INVENTION

The invention is concerned with a recovery technique which enables the size or number of the tanks to be reduced.

The invention provides a process for recovering at least one element from sulphide minerals which contain at least the element, the method including the steps of:

(a) subjecting the sulphide minerals to biological oxidation in a first tank in a series of tanks, (b) separating product from the first tank into a heavy fraction and a residual fraction, and (c) recovering at least the element from the residual fraction.

The process may include the steps of separating the residual fraction into a light fraction and a solution, and recovering at least one of the following elements from the light fraction: gold, silver, a member of the platinum group of metals.

When used for recovering gold the process may include the step of recovering gold from the light fraction by a non-biological process.

Preferably the non-biological process is cyanide dissolution.

The invention may include the step of recovering at least one base metal from the solution.

The base metal may for example be copper, nickel or cobalt. If precious metals are not present then the process may include the step, prior to step (c), of separating the residual fraction into a light fraction and a solution, and recovering at least one base metal from the solution. The base metal, as before, may for example be copper, nickel or cobalt.

The product from the first tank may be separated using density separation techniques. Sulphide minerals have a relatively high density and it has been found that the density of the mineral is lower when oxidation takes place. This means that it is possible to separate the oxidised material from the unoxidised material. Gravity separation devices such as spiral concentrators and shaking tables have been found to be suitable for this purpose.

Any other suitable or equivalent device, e.g. a thickening process, may be used for the separating the residual fraction into the light fraction and the solution.

BRIEF DESCRIPTION OF THE DRAWING

The Invention is further described by way of example with reference to the accompanying drawing which illustrates in block diagram form a gold recovery process according to the invention.

DESCRIPTION OF PREFERRED EMBODIMENT

The accompanying drawing illustrates various stages in a gold recovery process according to the invention.

Gold bearing sulphide minerals are milled and made into a water slurry 10. The slurry is relatively dilute and has from 10 to 20% solids content. The slurry is fed to a first agitated tank 12 which may be one of a series of tanks connected in series, in a known manner. The accompanying drawing illustrates a second tank 14 although it is to be understood that further tanks may be connected to the tank 14 downstream of the tank 14.

In the tank 12 the slurry is subjected to a biological oxidation process.

The product of this process consists of three elements. A heavy fraction consists of unoxidised or incompletely oxidised sulphide minerals. A light fraction consists of the oxidised or almost completely oxidised minerals. If gold were present then the gold would be present in an accessible form. A third phase is the solution which now contains the products of oxidation consisting of iron sulphate and sulphuric acid. If base metal sulphide minerals were present, then copper, nickel, cobalt etc. would be present in the solution.

Sulphide minerals have a relatively high density. The density of sulphide minerals is however lowered when oxidisation takes place. The product produced by the tank 12 is thus subjected to a gravity concentration step 16 making use of a gravity separation device such as a spiral concentrator or a shaking table.

The gravity separation step produces a heavy fraction 18 and a residual fraction 20.

The residual fraction is the oxidised material and this is subjected to a solid/liquid separation step 22 using any suitable process e.g. a thickener, which produces a light fraction 24 and a solution 26 which is neutralised and disposed of.

The light fraction 24 is treated by means of a cyanide dissolution process 28, which is known in the art, to recover gold 30.

It has been found that the light fraction is highly amenable to cyanide treatment and the degree of recovery of gold from the light fraction, by dissolution of cyanide in this way, is far higher than expected. Of the order of 97% of the gold present in the light fraction is soluble in cyanide.

About half of the material leaving the tank 12 is separated into the residual fraction 20. The heavy fraction 18 is sent for further oxidation to the second and remaining tanks in the series train of tanks. Consequently it is generally possible to reduce the sizes of the second and the remaining tanks by at least a factor of two.

It is also possible to repeat the light and heavy fraction separation of the material which is produced by the second or any succeeding tank thus making it feasible to reduce yet further the sizes of the remaining tanks in the series train.

As a variation to the invention all or part of the heavy fraction can be returned, as is indicated by means of a dotted line 32, directly to the first tank 12, as opposed to being fed to the second and remaining tanks 14. This reduces the requirement for additional tanks.

Two important variations are possible with the process of the invention.

In the first instance if the solution 26 contains base metals such as copper, nickel and cobalt then the solution can be treated using any known technique to recover the base metal content 34.

Another possibility is that the light fraction does not contain any meaningful quantity of precious metal. In this event the light fraction is neutralised, if necessary, and then discarded without being treated to recover the precious metal content This possibility is indicated by means of a dotted line 36 which denotes that the steps 28 and 30 are not carried out. It is to be understood therefore that, with this variation, the invention is not used for the recovery of gold or any other precious metal but, instead, is used for extracting base metals 34 such as copper, nickel and cobalt from the corresponding base metal sulphide minerals.

Thus, to summarise, the invention may be used for the recovery of precious metals and in particular gold from sulphide minerals; for the recovery of precious metals and base metals from sulphide minerals; or for the recovery of base metals alone, and not precious metals, from sulphide minerals.

I claim:

1. A process for recovering at least one element selected from the group consisting of gold, silver, the platinum group metals and base metals from sulphide minerals which contain the element, the process including the steps of:
   (a) subjecting the sulphide minerals to biological oxidation in a first tank in a series of tanks, to produce a product,
   (b) separating the product into a heavy fraction which contains at least unoxidised minerals and a residual fraction which contains at least oxidised sulphide minerals and products of oxidation,
   (c) recovering said at least one element from the residual fraction, and
   (d) subjecting the heavy fraction to further biological oxidation in the remaining tank or tanks in the series of tanks.

2. A process according to claim 1 wherein the sulphide minerals contain at least one element selected from the group consisting of gold, silver and the platinum group metals and wherein, in step c, the residual fraction is separated into a light fraction containing the at least one element and a solution, and the at least one element is recovered from the light fraction.

3. A process according to claim 2, wherein the sulphide minerals contain at least the element gold and the residual fraction is separated into a light fraction containing gold and a solution and gold is recovered from the light fraction by cyanide dissolution.

4. A process according to claim 2 wherein the sulfide minerals also contain at least one base metal and the solution contains said base metal and said base metal is recovered from the solution.

5. A process according to claim 1 wherein the sulfide minerals contain at least one element which is a base metal and the residual fraction is separated into a light fraction and a solution containing said at least one element which is a base metal and said at least one element which is a base metal is recovered from the solution.

6. A process according to claim 5 wherein the base metal is selected from the group consisting of copper, nickel and cobalt.

7. A process according to claim 2 wherein the residual fraction is separated into the light fraction and the solution by solid/liquid separation.

8. A process according to claim 1 wherein the heavy fraction is further oxidised in at least said first tank.

9. A process according to claim 1 wherein, in step (b), the product is separated into the heavy fraction and the residual fraction by gravity separation means.

10. A process according to claim 8 which includes the step of recovering said at least one element from said further oxidised heavy fraction.

11. A process for treating gold bearing sulphide minerals wherein a slurry of the minerals is biologically oxidised in a first tank in a series of tanks to produce a product, the product is separated into a light fraction and a heavy fraction, gold is recovered from the light fraction, the heavy fraction is passed to the remaining tank or tanks in said series of tanks for further biological oxidation, solids are separated from the heavy fraction from the final tank in said series of tanks, and gold is recovered from said solids.

12. The process according to claim 11 wherein the gold recovery from the light fraction is by cyanide dissolution.

* * * * *